Sept. 15, 1953  H. G. YATES  2,651,917
ROTARY HYDRAULIC COUPLING FOR FORWARD AND REVERSE DRIVE
Filed June 18, 1949
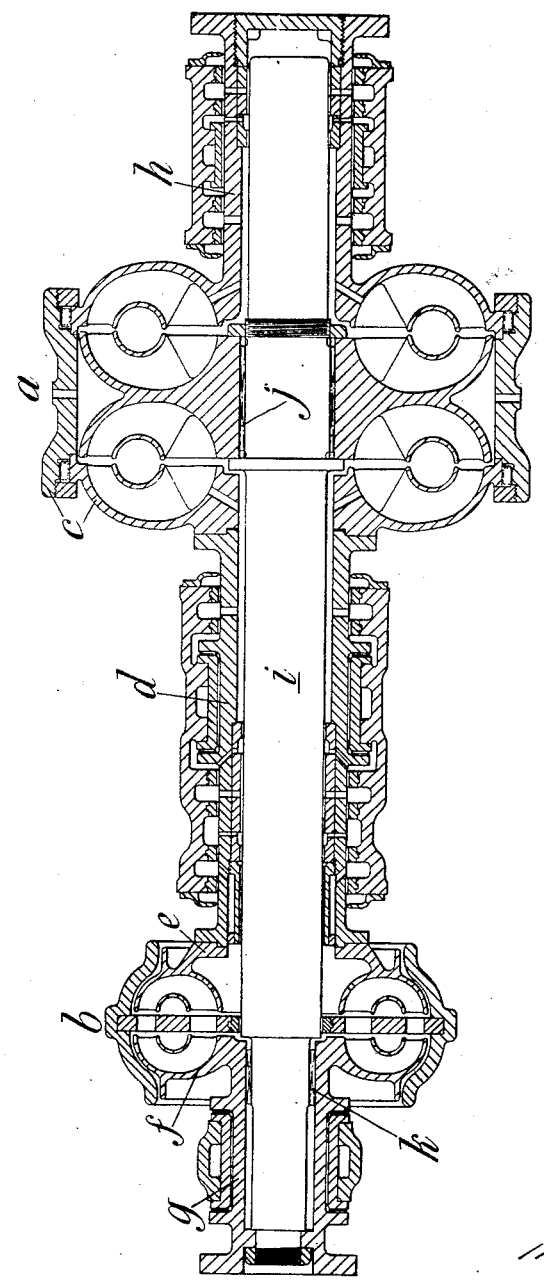
INVENTOR.
HENRY GEORGE YATES
BY
ATTORNEYS.

Patented Sept. 15, 1953

2,651,917

UNITED STATES PATENT OFFICE 2,651,917

ROTARY HYDRAULIC COUPLING FOR FORWARD AND REVERSE DRIVE

Henry George Yates, Riding Mill, England, assignor to The Parsons and Marine Engineering Turbine Research and Development Association, Wallsend, England Application June 18, 1949, Serial No. 100,053
In Great Britain July 19, 1948

2 Claims. (Cl. 60—54)

This invention relates to power plant transmission gearing in which power from a prime mover, e. g. a gas turbine, is conveyed to a driven member, e. g. a primary toothed pinion by way of ahead and reverse drive hydraulic couplings.

In the specification of application Ser. No. 730,508, filed February 24, 1947, and now abandoned, there is described a hydraulic coupling of the reversing type in which power enters through the hollow driven element.

Somewhat similar arrangements are described in the specification of application Ser. No. 733,065, filed March 7, 1947, and now abandoned, where the driven elements of hydraulic couplings of ahead and reverse driving type are attached to either end of a reduction gear pinion while the driving elements are coupled by a quill shaft passing through the pinion.

These arrangements are not convenient when access cannot be obtained to both ends of the pinion as for example in a reduction gear of epicyclic type, or if for other reasons it is impossible to make connections at both ends of a pinion.

The object of the present invention is to provide arrangements in which this drawback is eliminated.

The invention consists in a power plant transmission gearing comprising an ahead driving hydraulic coupling and a reverse driving hydraulic coupling, both couplings having driving and driven elements, a hollow cylinder connecting the driving elements of said couplings, a quill shaft within said cylinder connecting the driven elements of said couplings and a power output shaft connected to the end of said quill shaft remote from the ahead coupling.

The invention also consists in power plant transmission gearing as set forth in the preceding paragraph wherein the ahead coupling is of the double flow type.

The invention also consists in power plant transmission gearing as set forth in either of the two preceding paragraphs, wherein the reverse coupling is constructed in accordance with said application Ser. No. 733,065.

The invention also consists in power plant transmission gearing substantially as described with reference to the accompanying drawing.

The accompanying diagrammatic drawing illustrates in longitudinal section one convenient construction of power plant transmission gearing embodying the present invention.

In carrying the invention into effect according to one convenient form by way of example as illustrated, an ahead coupling $a$ of the double-flow type is provided and a reverse coupling $b$ of the nature indicated in said application Ser. No. 730,508 is provided. The casing $c$ of the ahead coupling $a$ is connected by way of a hollow cylinder $d$ to the driving member $e$ of the reverse coupling, the driven member $f$ of which coupling is connected to a power output hollow shaft $g$. The casing $c$ of the ahead coupling $a$ is also connected to a power input hollow shaft $h$ and within this shaft there is provided a quill shaft $i$ passing also through the aforesaid hollow cylinder $d$ and hollow power output shaft $g$, the latter being coupled thereto by splines $k$. This shaft is also coupled by splines $j$ to the driven member of the ahead coupling.

In a modified arrangement a single-flow ahead coupling is provided, the power input being applied as in the example illustrated to the outer casing and this casing being attached to the hollow cylinder connected to the driving member of the reverse coupling.

I claim:

1. A power plant transmission gearing comprising an ahead driving hydraulic coupling and a reverse driving hydraulic coupling, both couplings having driving and driven elements, a hollow cylinder connecting the driving elements of said couplings, a quill shaft within said cylinder connecting the driven elements of said couplings and passing through both said couplings, a power output shaft connected to the end of said quill shaft remote from the ahead coupling, and a hollow power input shaft surrounding the other end of the quill shaft and connected to the ahead coupling driving element.

2. Power plant transmission gearing as claimed in claim 1 wherein the ahead coupling is of the double flow type.

HENRY GEORGE YATES.

References Cited in the file of this patent

UNITED STATES PATENTS

| Number | Name | Date |
|---|---|---|
| 1,199,360 | Föttinger | Sept. 26, 1916 |
| 1,757,827 | Bauer et al. | May 6, 1930 |
| 2,194,949 | Lysholm | Mar. 26, 1940 |
| 2,213,342 | Gössler | Sept. 3, 1940 |
| 2,297,196 | Berger | Sept. 29, 1942 |
| 2,298,310 | Ray | Oct. 13, 1942 |

FOREIGN PATENTS

| Number | Country | Date |
|---|---|---|
| 457,435 | Great Britain | Nov. 27, 1936 |